(12) United States Patent
Take et al.

(10) Patent No.: US 6,483,819 B1
(45) Date of Patent: Nov. 19, 2002

(54) RADIO COMMUNICATION SYSTEM AND METHOD USING SPACE-DIVISION MULTIPLE ACCESS

(75) Inventors: Keijiro Take, Tokyo (JP); Ryoichi Fujie, Tokyo (JP); Syuji Ito, Tokyo (JP)

(73) Assignee: Mitsubishi Denki Kabushiki Kaisha, Tokyo (JP)

( * ) Notice: Subject to any disclaimer, the term of this patent is extended or adjusted under 35 U.S.C. 154(b) by 0 days.

(21) Appl. No.: 09/266,760

(22) Filed: Mar. 12, 1999

(30) Foreign Application Priority Data

Sep. 16, 1998 (JP) .................................. 10-261105

(51) Int. Cl.[7] .................................................. H04J 1/16
(52) U.S. Cl. ...................................... 370/329; 370/465
(58) Field of Search ................................ 370/329, 330, 370/335, 336, 337, 338, 341, 342, 343, 344, 345, 346, 347, 350, 319, 320, 321, 314, 315, 441, 442, 468, 465; 375/130, 295, 316; 455/422, 427, 428, 509, 515

(56) References Cited

U.S. PATENT DOCUMENTS

| | | | |
|---|---|---|---|
| 5,038,342 A | * | 8/1991 | Chisler et al. .............. 370/341 |
| 5,732,075 A | | 3/1998 | Tangemann et al. |
| 5,815,525 A | * | 9/1998 | Smith et al. ................. 375/316 |
| 5,859,879 A | * | 1/1999 | Bolgiano et al. ............ 375/347 |

FOREIGN PATENT DOCUMENTS

| | | |
|---|---|---|
| GB | 2 309858 A | 8/1997 |
| JP | 7170561 | 7/1995 |

* cited by examiner

Primary Examiner—Dang Ton
(74) Attorney, Agent, or Firm—Rothwell, Figg, Ernst & Manbeck

(57) ABSTRACT

The present invention provides a radio communication system and a method thereof, which successively use the same frequency even when a plurality of mobile stations served by the same base station move and come close with one another and a space-division access system becomes unavailable which uses an antenna beam forming function of the base station. In the system, an access system switching unit is periodically started, and it initially clears the existing group relationships in a mobile station tracking-information table. The unit then examines the table and compares a difference of the directional angles of respective mobile stations with a predetermined threshold level. If the directional angles show a difference, the unit continues the examination with respect to other combinations of the mobile stations. If the difference is smaller than the threshold, the associated two mobile stations are grouped. After comparing adjacency of all combinations of the mobile stations, baseband units of the base station and each mobile station are instructed to change the access system of the grouped mobile stations from the space-division access system to a time-division access system.

14 Claims, 14 Drawing Sheets

| MOBIL STATION ID | DIRECTIONAL ANGLE (IN DEGREE) | GROUP ID |
|---|---|---|
| 1 | 42 | 1 |
| 2 | 63 | 2 |
| 3 | 64 | 2 |

FIG. 2

| MOBIL STATION ID | INTERFERING MOBIL STATION ID | GROUP ID |
|---|---|---|
| 1 | 2 | 1 |
| 2 | 1 | 2 |
| 3 | -- | 2 |

FIG. 6

RADIO COMMUNICATION SYSTEM AND METHOD USING SPACE-DIVISION MULTIPLE ACCESS

BACKGROUND OF THE INVENTION

1. Field of the Invention

The present invention relates to a radio communication system and a method thereof which realize a space division access by dynamically generating the antenna beam at a base station.

2. Description of the Prior Art

FIG. 13 schematically shows the structure of a conventional base station disclosed in Japanese Laid-open patent publication No. 7-170561. A base station 1301 as shown in FIG. 13 comprises a DBF antenna 1302, a baseband unit 1303, a radio unit 1304 and a tracking control unit 1305.

The operation of the base station will be briefly explained below. The tracking control unit 1305 has a function of tracking each moving mobile station and instructing the DBF antenna 1302 to change the direction of the beam. The DBF antenna 1302 functions to generate a plurality of arbitrary beams in accordance with the instructions sent from the tracking control unit 1305.

With these functions, the base station is capable of realizing a space division access by using the same frequency for each mobile station and providing a high-speed transmission and effective utilization of frequencies.

In a conventional radio communication system, when mobile stations move and come close to other stations, the beams emitted by each mobile station may overlap in the air. This raises a problem that the space division access cannot be realized. To avoid this problem, the conventional radio communication system adopts a frequency division access, namely, the system deals with this problem by changing a frequency of each beam. The operation of the conventional radio communication system will be explained below with reference to FIGS. 14A and 14B.

In FIGS. 14A and 14B, a reference numeral 1401 shows a base station with a DBF (Digital Beam Forming) antenna (which is also called an adaptive antenna), 1402, a mobile station A, 1403, a mobile station B, 1404, the beam to the mobile station A, 1405, the beam to the mobile station B, 1406, the beam to the mobile station A used in a frequency division access and 1407, the beam to the mobile station B used in a frequency division access.

As shown in FIG. 14A, when the mobile stations A and B are separately located with each other, these mobile stations can access the base station by a space-division access method which uses the beams. In FIG. 14A, the beams 1404 and 1405 have the same frequency (f1). If it is detected as shown in FIG. 14B that one mobile station moves and comes close to the another mobile station (both of which use the same frequency), then a frequency used for the beam to the mobile station A (1406) is changed to the one that is different from a frequency used for the beam to the mobile station B (1407), resulting in separation of signals received from each mobile station.

However, there is a problem that the larger the number of frequencies used in one base station, the lower the efficiency of frequency utilization.

SUMMARY OF THE INVENTION

The present invention has been made to solve the above-mentioned problem. It is an object of the present invention to provide a communication system and a method thereof for using frequencies effectively even if the mobile stations move and become closely located with one another.

The present invention provides a radio communication system which is provided with a plurality of mobile stations and a base station connected to the mobile stations via a radio, said plurality of mobile stations are served by the same base station and are using the same frequency, the system comprising detection means for detecting whether said plurality of mobile stations are closely located with one another and said base station is impossible to provide a space-division access system using an antenna-beam forming function and change-over means for causing said plurality of mobile stations and said base station to change their access systems from the space-division access system to a time-division access system if it is detected by said detection means that said base station is unable to provide the space-division access system, wherein said plurality of mobile stations and said base station successively use said same frequency for implementation of the time-division access system.

The radio communication system further comprises means for storing location information obtained by tracking said plurality of mobile stations and means for grouping any combination of said plurality of mobile stations which are caused to change the access system, in accordance with said location information.

In the radio communication system according to the present invention, said plurality of mobile stations have means for detecting interference caused by other adjacent mobile stations and notifying the base station of said interference, and wherein said base station is provided with means for deciding from said notification that the space-division access system becomes unavailable.

In the radio communication system according to the present invention, said change-over means including means for maintaining an information transmission rate per each of said mobile stations by increasing an information transmission rate per said radio communication system, when the space-division access system becomes unavailable.

In the radio communication system according to the present invention, said change-over means including means for notifying upper layers associated with an application and the user of the fact that a transmission rate within a radio zone is decreased, when the space-division access system becomes unavailable.

The present invention also provides a radio communication method used in a radio communication system which is provided with a plurality of mobile stations and a base station connected to the mobile stations via a radio, said plurality of mobile stations are served by the same base station and are using the same frequency, the method comprising the steps of detecting whether said plurality of mobile stations are closely located with one another and said base station is impossible to provide a space-division access system using an antenna-beam forming function and causing said plurality of mobile stations and said base station to change their access systems from the space-division access system to a time-division access system if it is detected in said detecting step that said base station is unable to provide the space-division access system, wherein said plurality of mobile stations and said base station successively use said same frequency for implementation of the time-division access system.

The radio communication method according to the present invention, further comprising the steps of storing location information obtained by tracking said plurality of mobile stations and grouping any combination of said plurality of mobile stations which are caused to change the access system, in accordance with said location information.

In the radio communication method according to the present invention, interference caused by other adjacent mobile stations is detected in said plurality of mobile stations and the base station is notified of said interference, and in said base station, the space-division access system is decided to become unavailable from said notification.

In the radio communication method according to the present invention, said step of causing to change the access system including a step of maintaining an information transmission rate per each of said mobile stations by increasing an information transmission rate per said radio communication system, when the space-division access system becomes unavailable.

In the radio communication method according to the present invention, said step of causing to change the access system including a step of notifying upper layers associated with an application and the user of the fact that a transmission rate within a radio zone is decreased, when the space-division access system becomes unavailable.

BRIEF DESCRIPTION OF THE DRAWINGS

The present invention will become more fully understood by the accompanying drawings which are given by way of illustration only, and thus are not limitative of the present invention, and wherein:

FIG. 2 is a view of a mobile station tracking-information table which is internally located in the base station of the radio system according to a first embodiment of the present invention;

FIG. 6 depicts a mobile station interference-information table in a base station of a radio system according to a second embodiment of the present invention;

DETAILED DESCRIPTION OF THE PREFERRED EMBODIMENTS

Further scope of applicability of the present invention will become apparent from the detailed description given hereinafter. However, it should be understood that the detailed description and specific examples, while indicating preferred embodiments of the invention, are given by way of illustration only, since various changes and modifications within the spirit and scope of the invention will become apparent to those skilled in the art from this detailed description.

First Embodiment

Figure 1:
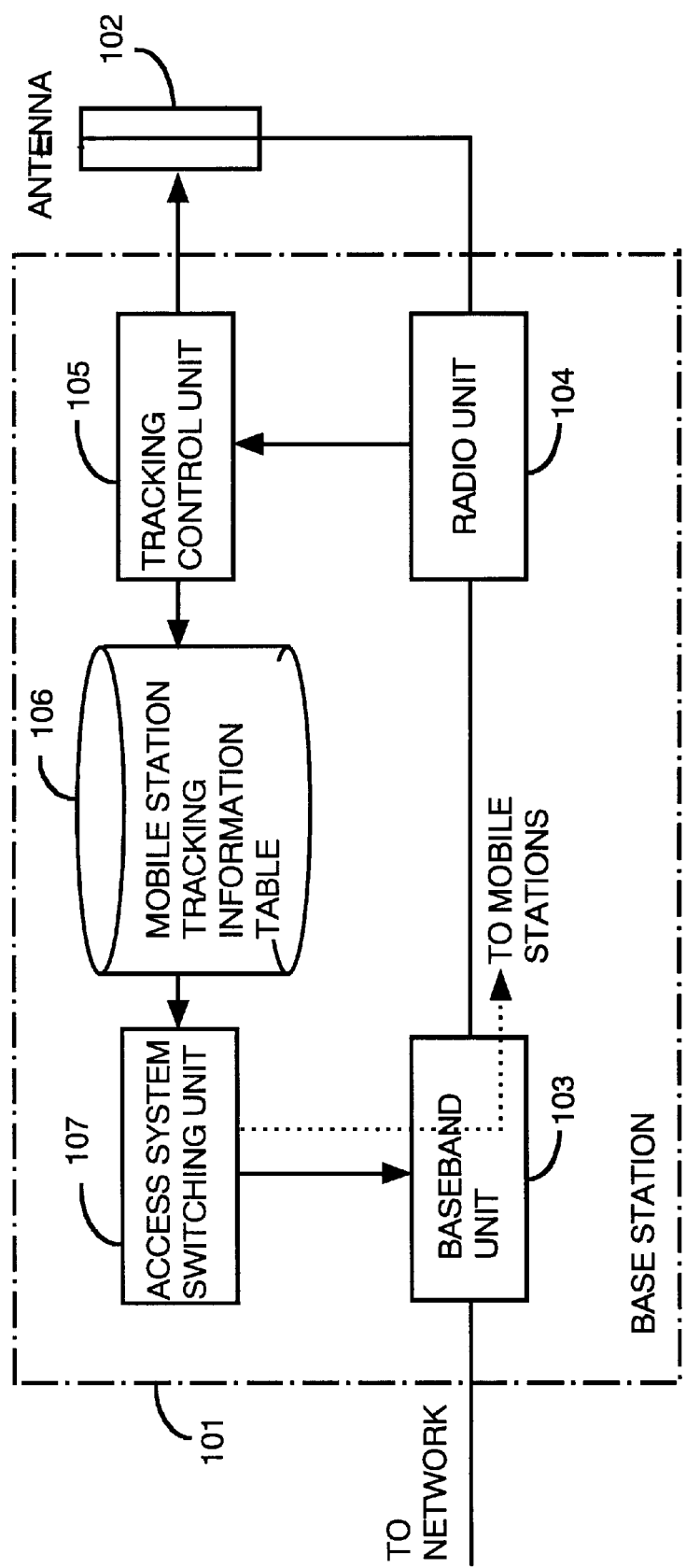
FIG. 1 is a block diagram of a base station of a radio system according to a first embodiment of the present invention.

FIG. 1 shows the structure of a base station of a radio system according to a first embodiment of the present invention. The base station 101 of FIG. 1 includes a DBF antenna 102, a baseband unit 103, a radio unit 104, a tracking control unit 105, a mobile-station tracking information table 106 and an access system switching unit 107.

FIG. 2 illustrates contents of a mobile station tracking-information table of FIG. 1. The table contains relationships between a mobile station ID, a directional angle and a group ID. The mobile station ID is a numeral for identifying a mobile station which is under control of the base station. The directional angle (in degree) is a directional angle of the mobile station as viewed from the base station, which is updated at any time by the tracking control unit. The group ID is a numeral for identifying a mobile station group. When mobile stations stay close with each other, the same numerals are allocated to these mobile stations. These numerals are temporarily given by the access system switching unit 107.

The operation of the base station according to the first embodiment of the present invention will be explained below.

The tracking control unit 105 performs tracking of locations of each mobile station in association with the radio unit 104 and controls the DBF antenna 102 so that the antenna incessantly radiates the beam toward each mobile station. At the same time, the tracking control unit sets location information of the mobile stations at any time, which is obtained by the tracking, in the mobile station tracking-information table 106.

Figure 3:
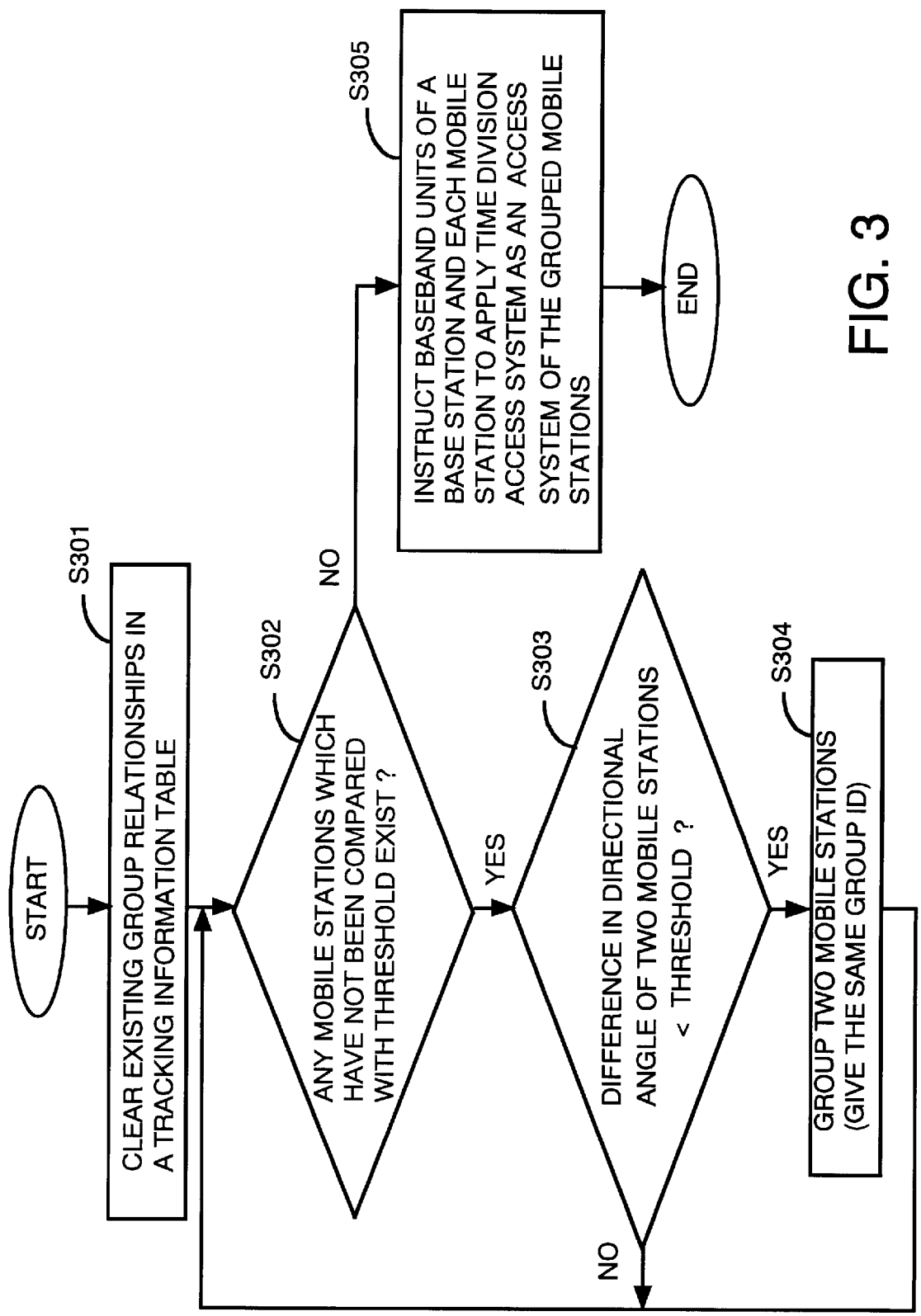
FIG. 3 is a flowchart showing the operation of an access system switching unit of a base station of a radio system according to a first embodiment of the present invention.

The operation of the access system switching unit 107 will be explained below with reference to FIG. 3. The access system switching unit is periodically activated and initially clears the existing group relationships stored in the mobile station tracking-information table (step S301). The unit then examines the table and compares a difference of the directional angle between the mobile stations with a predetermined threshold level (step S303). If there is a difference in the directional angle, the unit causes these mobile stations to maintain the present space division access system, because the present access system can deal with these mobile stations. The access system switching unit 107 then continues to examine the table with regard to other combinations of the mobile stations.

If the difference of a directional angle between two mobile stations is smaller than the threshold level, these two mobile stations are so closely located with each other that the beams associated with these stations may almost overlap in the air. In this case, these two mobile stations are grouped (step S304). After the degree of adjacency with regard to all combinations of the mobile stations is compared, that is, if NO is rendered in step S302, the baseband units of the base station and each mobile station are so instructed that the grouped mobile stations which are so closely located with one another change over their access system from the space division access system to the time-division access system (step S305).

The time-division access system which is applicable to the present system includes a method to equally distribute bands to the mobile stations which are to be accessed and a method to divide bands in accordance with the band of each mobile station which is in use.

It should be noted that even when the ordinary space division access is performed, a frame synchronization with a frame which is to be used in case of the time division access, makes establishment of synchronization easier in a case where the access system is changed over.

Figure 4B:
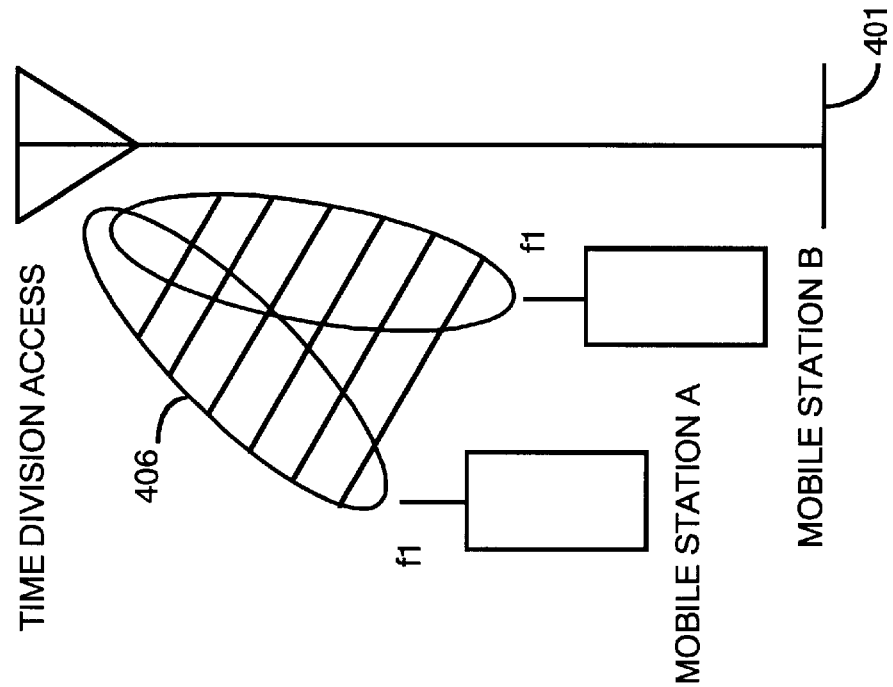
FIGS. 4A and 4B schematically show the operation of a radio system according to a first embodiment of the present invention.
Figure 4A:
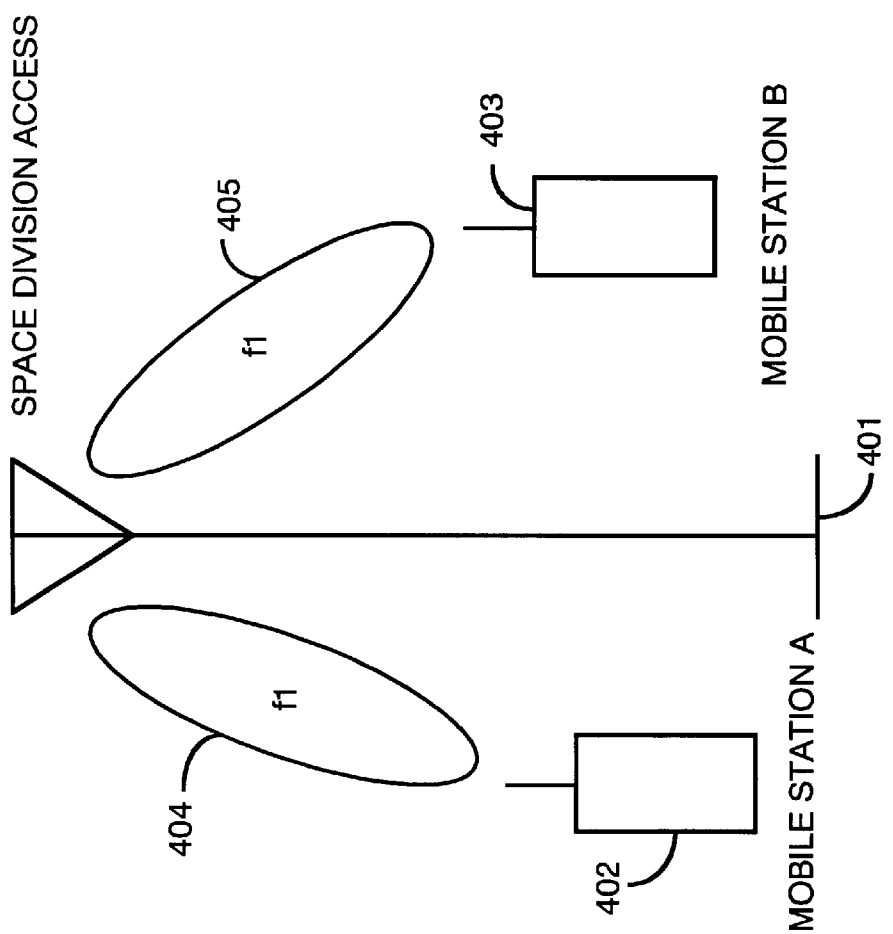

FIGS. 4A and 4B are schematic diagrams showing the operation of the radio communication system according to the first embodiment of the present invention. In FIGS. 4A and 4B, a reference numeral 401 denotes a base station with a DBF antenna, 402, a mobile station A, 403, a mobile station B, 404, the beam to the mobile station A, 405, the beam to the mobile station B, and 406, the beams to the mobile stations A and B to be used in a time-division access manner.

As shown in FIG. 4A, when the mobile stations A and B are physically separated with each other, these mobile stations can access the base station by using a space-division access method which uses the beams. In FIG. 4A, each of the beams 404 and 405 uses the same frequency (f1). If the base station detects that one mobile station moves and comes close to the another mobile station, and both of the mobile stations use the same frequency as shown in FIG. 4B, the base station changes the access system from the space-division access system to the time-division access system. In FIG. 4B, on the other hand, the same frequency is used for the beams 406 to the mobile stations A and B, and the time-division access system is adopted as an access method.

As mentioned above, even when the space division access becomes impossible to use, the number of frequencies required to be used per base station can be prevented from increasing. Accordingly, effective utilization of frequencies can be realized in the whole system.

Second Embodiment

In the first embodiment of the present invention, a mobile station to which the access system is changed from the space-division access system to the time-division access system is extracted from the tracking information of the beam. In a second embodiment of the present invention, one mobile station detects interference caused by other neighboring mobile stations and notifies a base station of the interference condition. The base station then decides that the space division access becomes unavailable.

Figure 5:
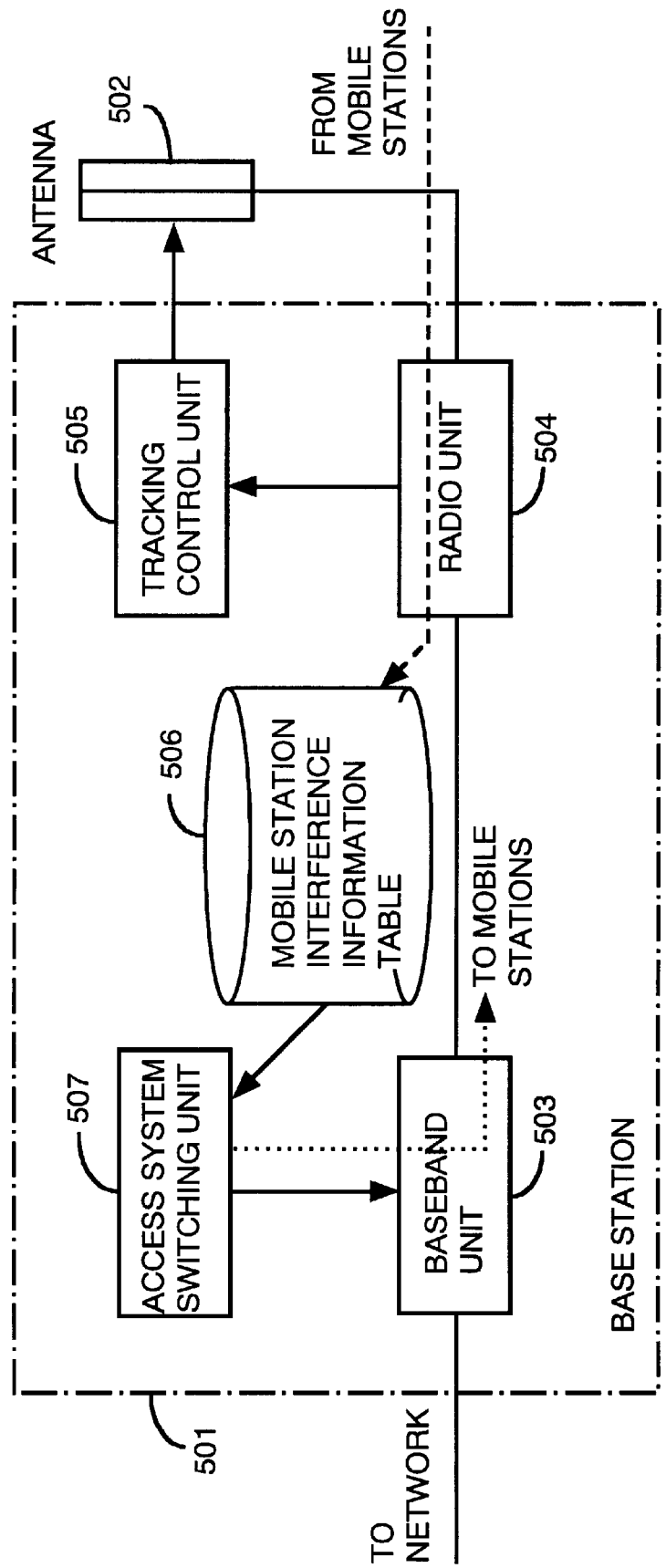
FIG. 5 is a block diagram of a base station of a radio system according to a second embodiment of the present invention.

FIG. 5 is a block diagram showing the structure of a base station according to the second embodiment of the present invention. In FIG. 5, a reference numeral 501 denotes a base station, 502, a DBF antenna, 503, a baseband unit, 504, a radio unit, 505, a tracking control unit, 506, a mobile station interference-information table and 507, an access system switching unit.

FIG. 6 shows contents of a mobile station interference-information table of FIG. 5. The table contains relationships between a mobile station ID, an interfering mobile station ID and a group ID. The mobile station ID is a numeral for identifying a mobile station which is under control of the base station. The interfering mobile station ID is an ID of the mobile station which causes interference by transmitting an interfering signal to other mobile stations and this ID is updated at any time in accordance with information from each mobile station. The group ID is a numeral for identifying a mobile station group. To the mobile stations which are closely located with each other, the same numerals are given which are allocated temporarily by the access system switching unit.

The operation of the base station according to the second embodiment of the present invention will be explained below. The mobile station normally receives a signal from the base station over signal reception channels. However, if the mobile station detects the interference from other mobile stations, it notifies the base station of the fact that the mobile station is interfered, including the mobile station ID of a mobile station which is causing the interference. The base station forms at any time the mobile station interference-information table 506 based on the interference information from each mobile station.

Figure 7:
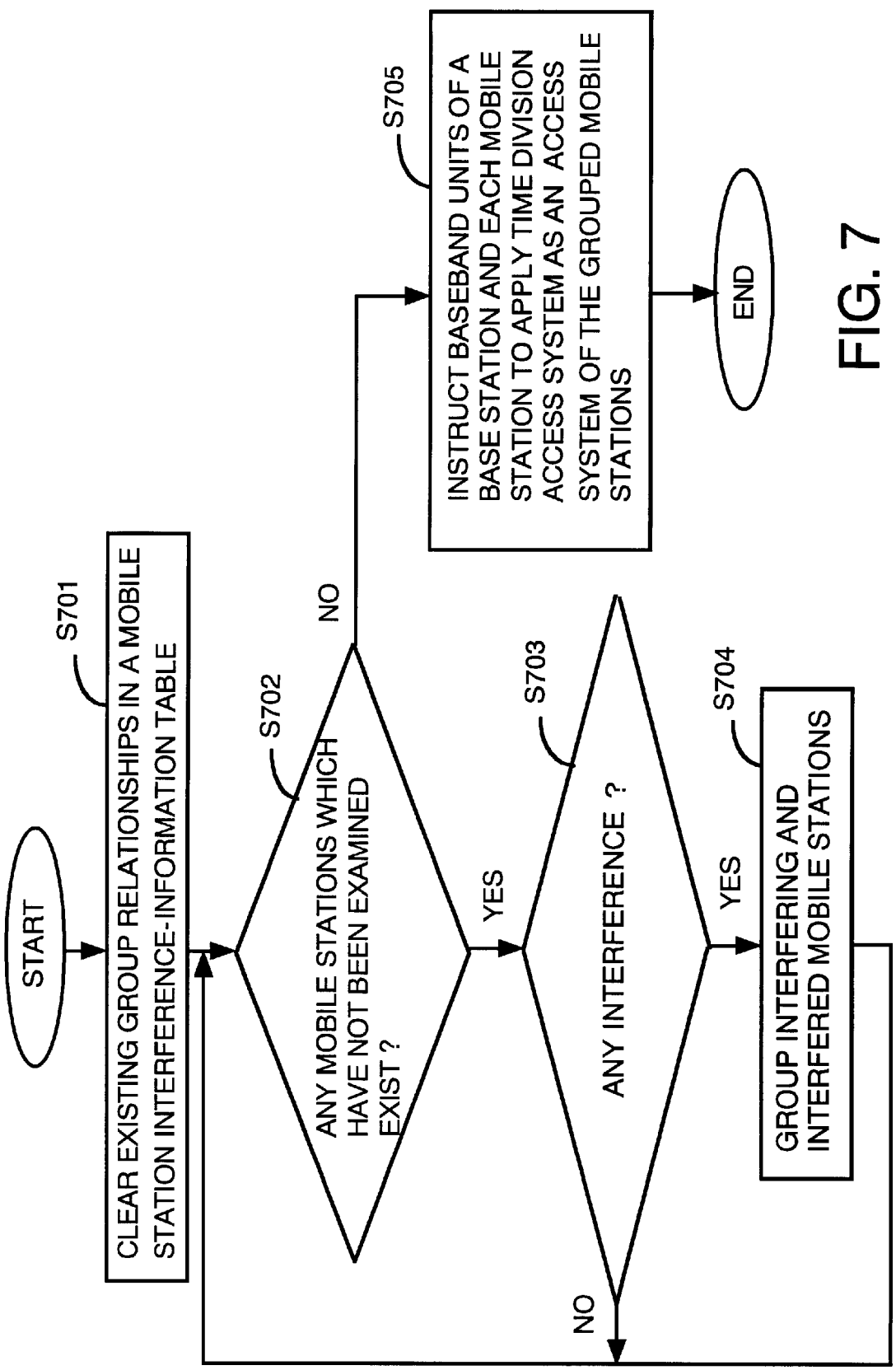
FIG. 7 is a flowchart showing the operation of an access system switching unit of a base station of a radio system according to a second embodiment of the present invention.

The operation of the access system switching unit 507 will be explained below with reference to FIG. 7. The access system switching unit is periodically activated and initially clears the existing group relationships stored in the mobile station interference-information table (step S701). The unit then monitors the table and examines whether any one mobile station is interfered by other mobile stations (steps S702 and S703). If it is decided that there is no interference, the access system switching unit 507 causes the mobile station to maintain the present space-division access system, since this access system can deal with the mobile station. The unit then continues the examination with respect to other mobile stations.

If the mobile station is being interfered, the interfering mobile station and the interfered mobile station are grouped (step S704). After the interference condition with regard to all combinations of the mobile stations is examined and NO is rendered in step S702, the process proceeds to step S705. In this case, there is a problem that two mobile stations grouped are being interfered with each other, thus the baseband units of the base station and each mobile station are so instructed that these two mobile stations switch their access system from the space-division access system to the time-division access system (step S705).

As mentioned above, the access system is changed over based on information on a mutual interference of the mobile stations which has been detected by the mobile station, it is therefore possible to avoid interference by changing the access system from the space-division access system to the time-division access system under the condition where mobile stations are being interfered with each other, even when the base station may carry out the space division access using the beams.

Figure 8:
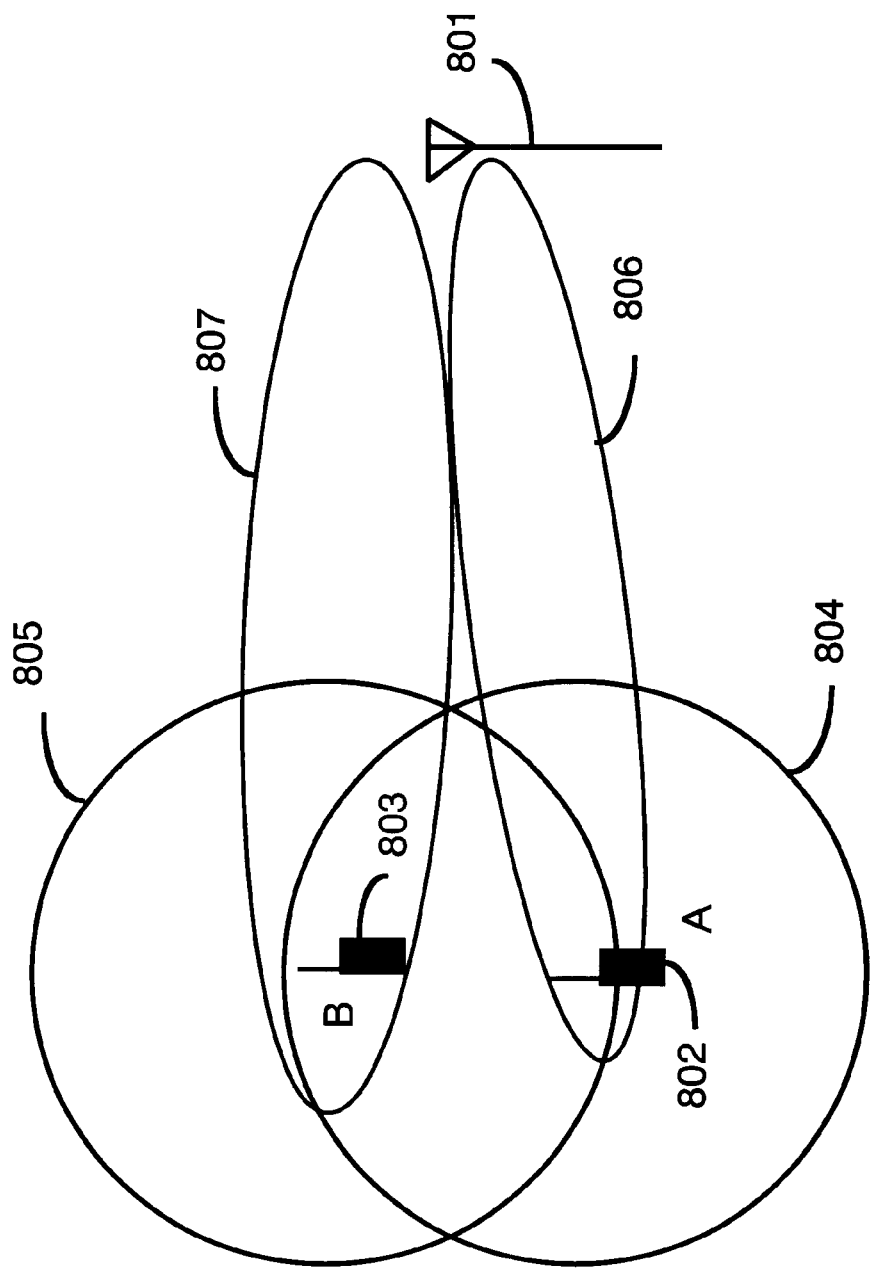
FIG. 8 illustrates physical locations of a base station and mobile stations of a radio system according to a second embodiment of the present invention.

In the second embodiment of the present invention, the antenna located at the base station can form beams, which is especially effective when the mobile station uses the ordinary omnidirectional antenna. FIG. 8 is a diagram related to the effect of the second embodiment.

In FIG. 8, a reference numeral 801 indicates a base station with a DBF antenna, 802, a mobile station A, 803, a mobile station B, 804, a pattern of an antenna gain at the mobile station A, 805, a pattern of an antenna gain at the mobile station B, 806, a pattern of the beam from the base station associated with the mobile station A and 807, a pattern of the beam from the base station associated with the mobile station B.

The base station 801 can efficiently discriminate signals sent from the mobile stations A and B (802 and 803 respectively) over the beams. However, as shown in FIG. 8, the mobile stations 802 and 803 are contiguous and they may mutually interfere with each other. This may result in that these mobile stations cannot correctly receive signals from the base station.

The problem mentioned above can be solved by mounting a DBF antennas on the mobile stations and directing the beam toward the base station. The DBF antenna still has a problem that it is not practically suitable to be mounted on the mobile station in terms of its size, weight, cost and the like, since the DBF antenna constitutes a plurality of antenna elements, a phase convertor for controlling these elements, a control unit, etc. Accordingly, the method provided by the second embodiment of the present invention is especially effective in this case.

It should be noted that the second embodiment of the present invention can also be combined with the method described in the first embodiment of the present invention.

Third Embodiment

Figure 9:
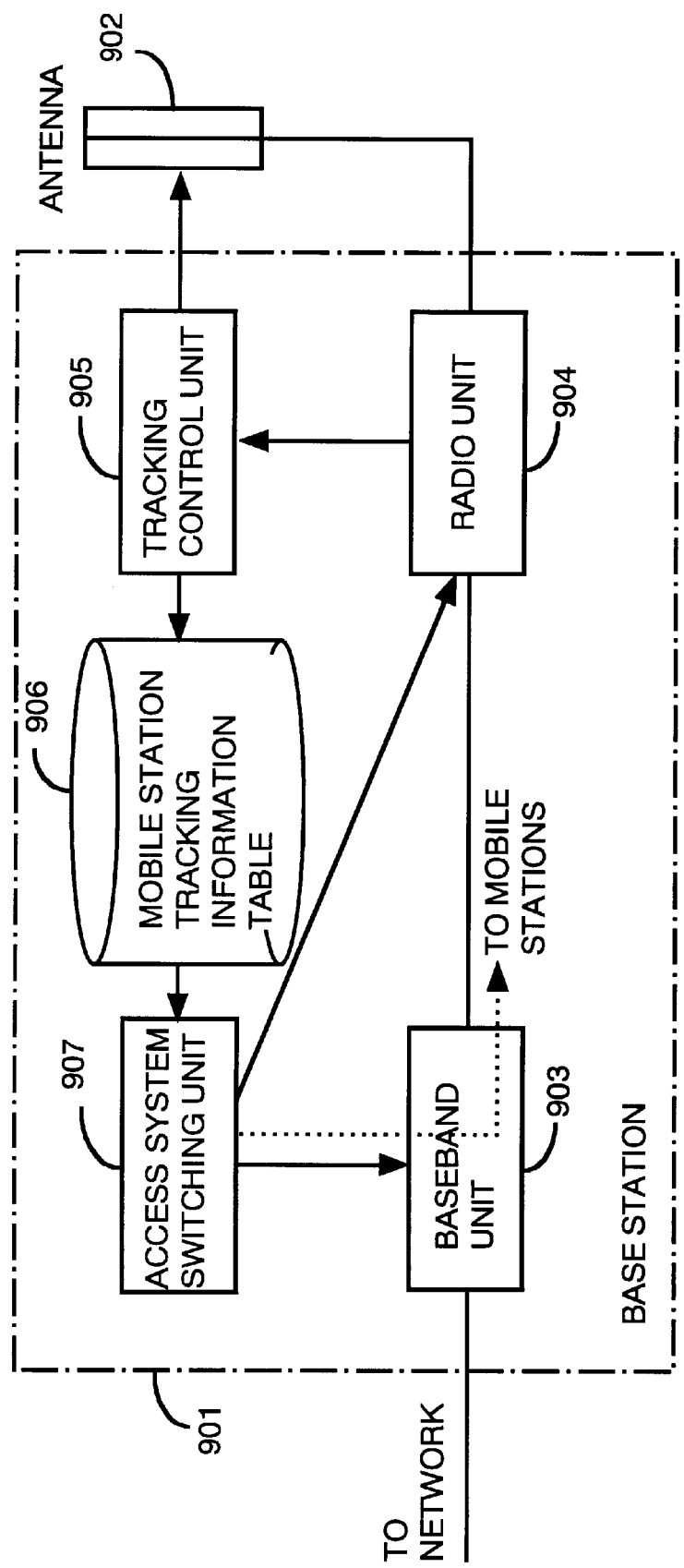
FIG. 9 is a block diagram of a base station of a radio system according to a third embodiment of the present invention.

FIG. 9 illustrates the configuration of a base station according to a third embodiment of the present invention. As shown in FIG. 9, a base station 901 includes a DBF antenna 902, a baseband unit 903, a radio unit 904, a tracking control unit 905, a mobile station tracking-information table 906 and an access system switching unit 907.

Figure 10:
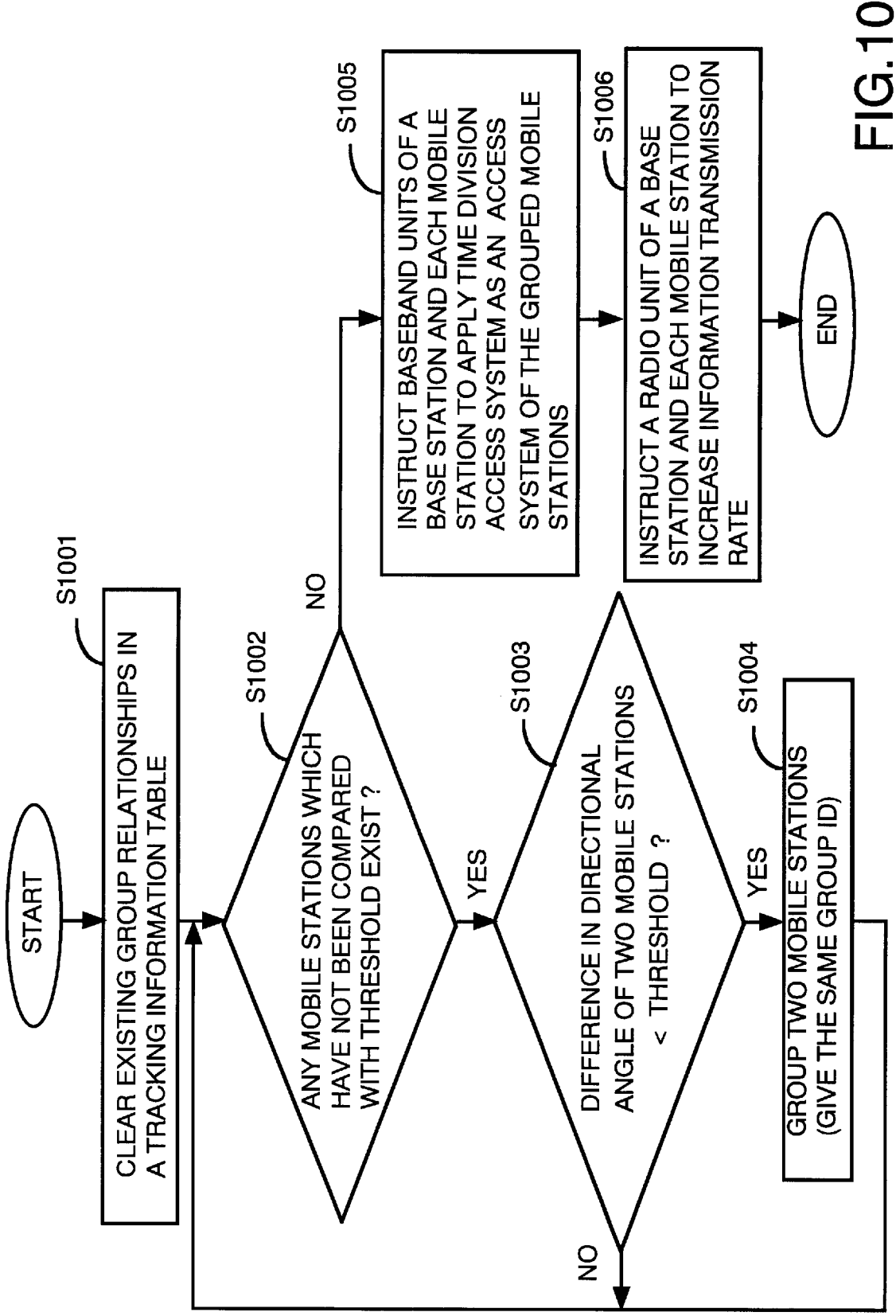
FIG. 10 is a flowchart showing the operation of an access system switching unit of a base station of a radio system according to a third embodiment of the present invention.

Followings are the operation of the base station according to the third embodiment of the present invention. Note that the operation of the tracking control unit 905 is the same as that described in the first embodiment. The operation of the access system switching unit 907 will be explained below with reference to FIG. 10. Processings performed in steps S1001 to S1005 of FIG. 10 are the same as those processed in steps S301 to S305 of FIG. 1 (First Embodiment). Accordingly descriptions of the processings in steps S1001 to S1005 are omitted here. In the third embodiment of the present invention, the baseband units of the base station and each mobile station are so instructed that the grouped mobile stations change over their access system from the space-division access system to the time-division access system (step S1005). At the same time, the radio unit 904 of the base station and the mobile stations (not shown) are instructed to increase their information transmission rate within the radio zone.

Increasing a modulation speed and simplifying an error correction are regarded as a method for increasing the information transmission rate. As for the ratio of increasing the modulation speed, a method of maintaining the information transmission rate which has been used by each mobile station, a method of keeping the upper limit values associated with constraint of the radio unit, etc can be applied.

As mentioned above, the third embodiment of the present invention advantageously prevents the slowing down of the information transmission rate per mobile station which may be caused by changing the access system to the time-division access system.

Fourth Embodiment

Figure 11:
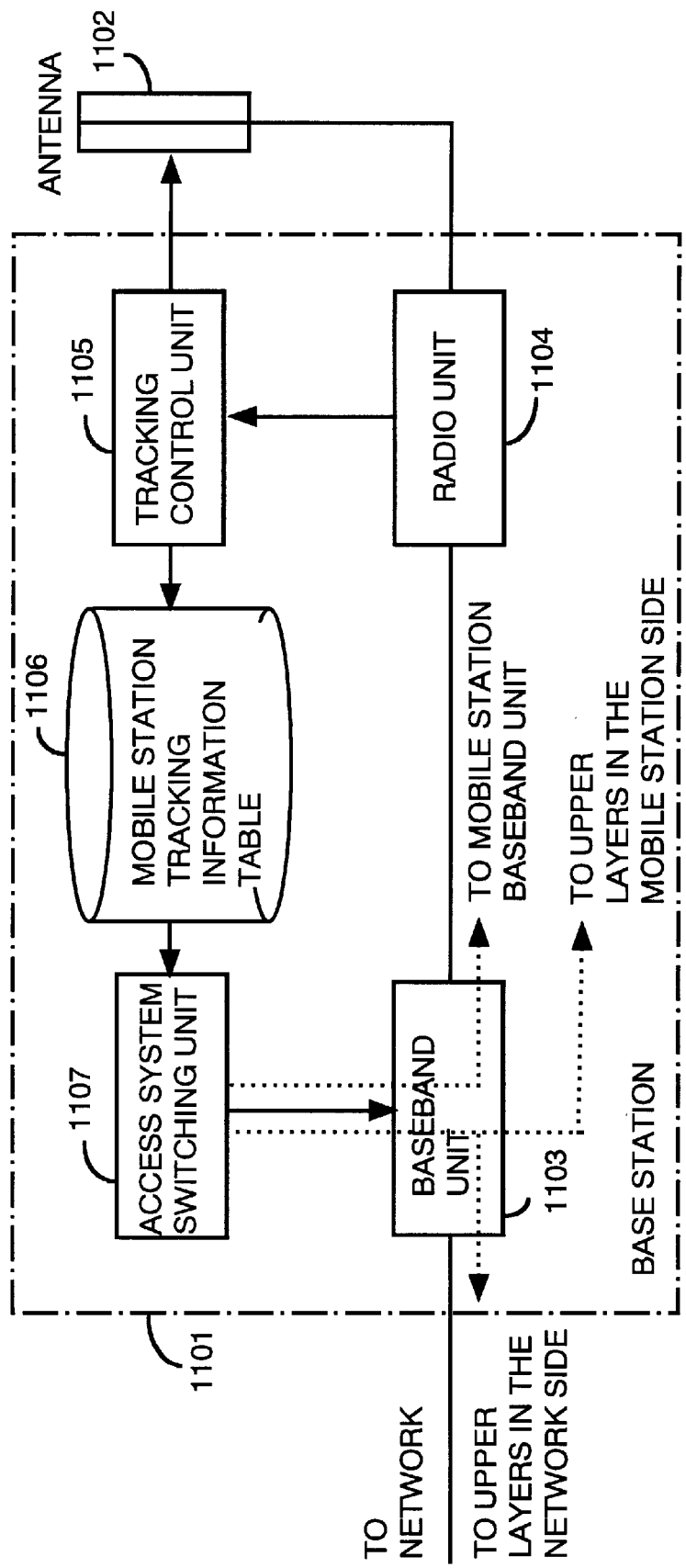
FIG. 11 is a block diagram of a base station of a radio system according to a fourth embodiment of the present invention.

FIG. 11 shows the structure of a base station according to a fourth embodiment of the present invention. In FIG. 11, a base station 1101 includes a DBF antenna 1102, a baseband 1103, a radio unit 1104, a tracking control unit 1105, a mobile station tracking-information table 1106 and an access system switching unit 1107.

The operation of the base station according to the fourth embodiment of the present invention will be explained below. It should be noted that the operation of the tracking control unit 1105 is the same as that of the first embodiment.

Figure 12:
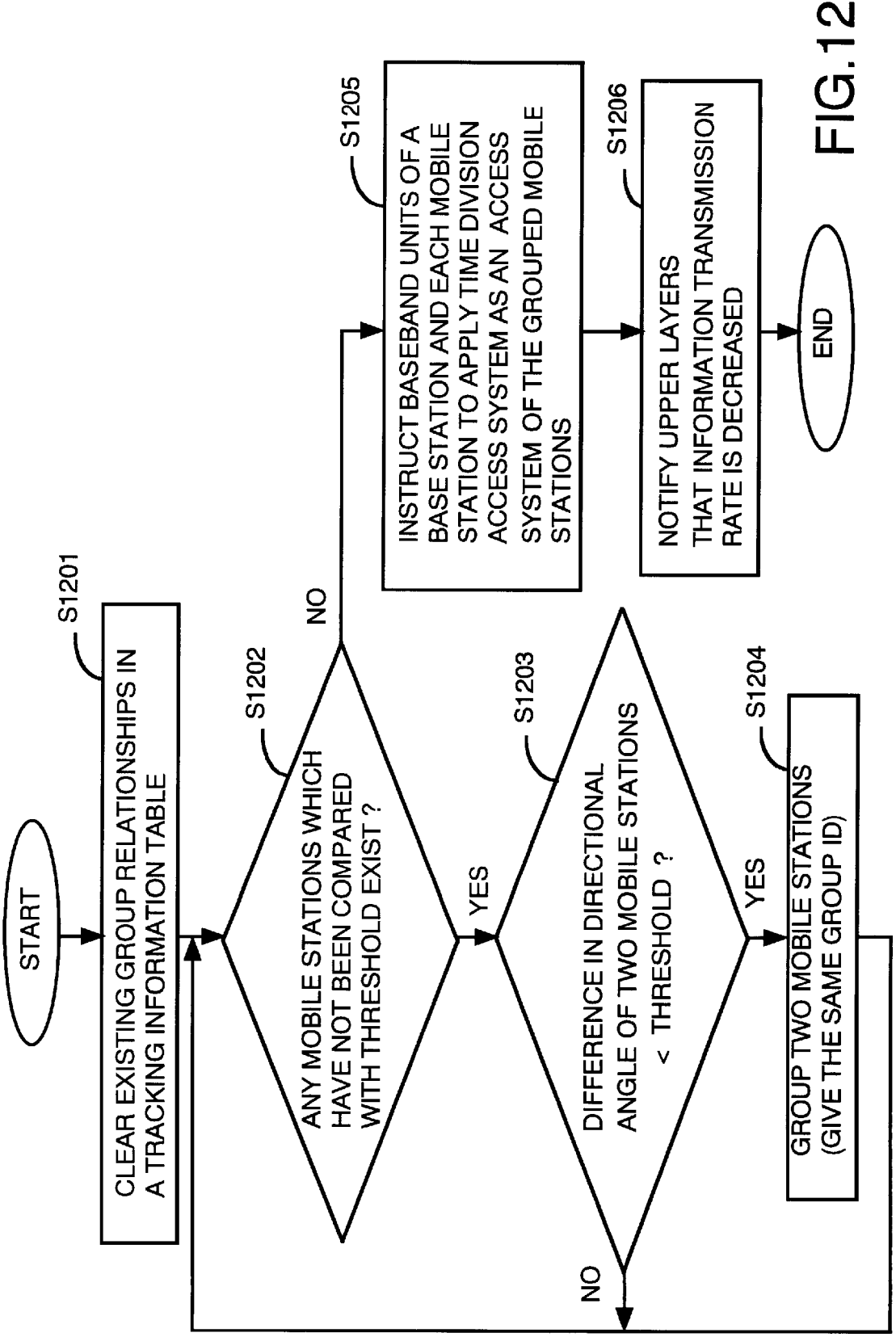
FIG. 12 is a flowchart showing the operation of an access system switching unit of a base station of a radio system according to a fourth embodiment of the present invention.
Figure 13:
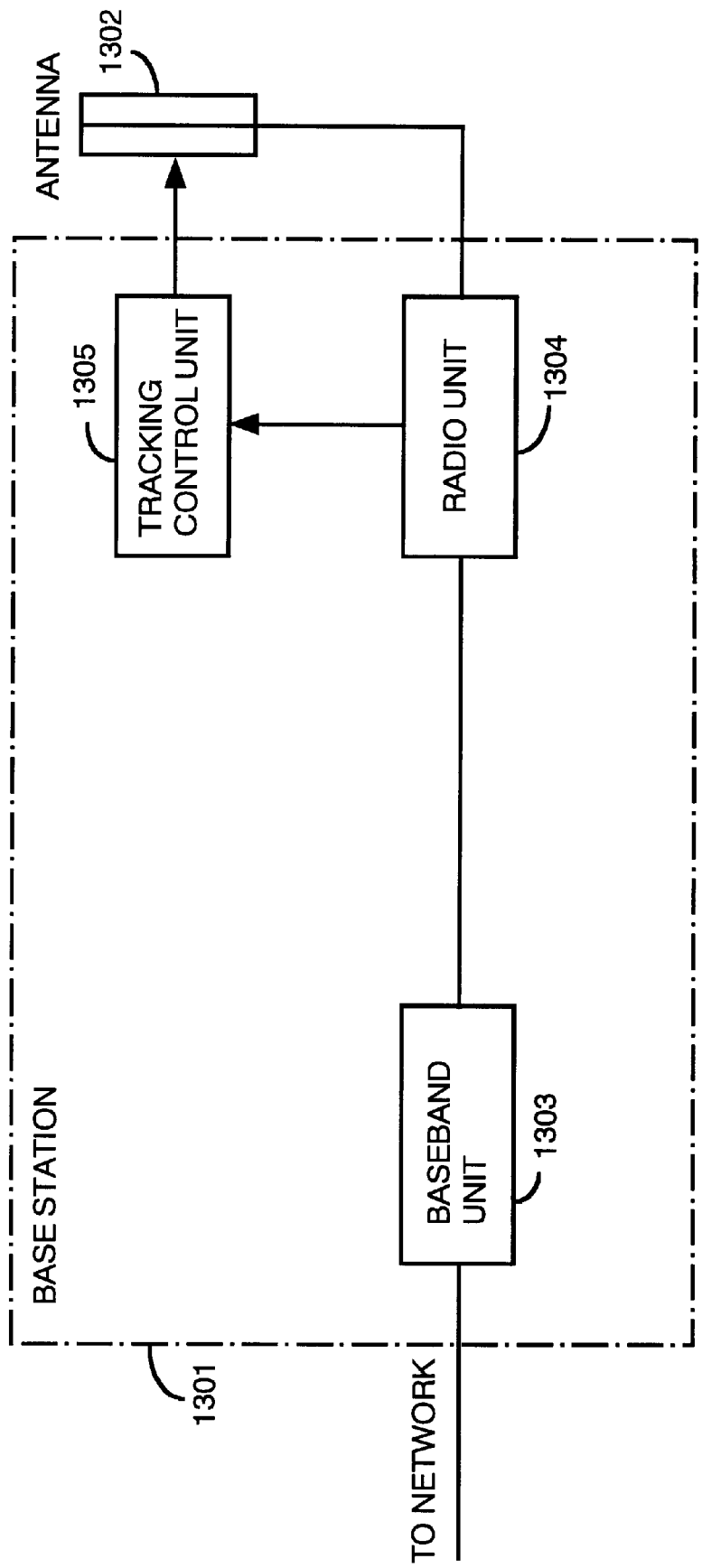
FIG. 13 is a block diagram of a base station of a conventional radio system.
Figure 14B:
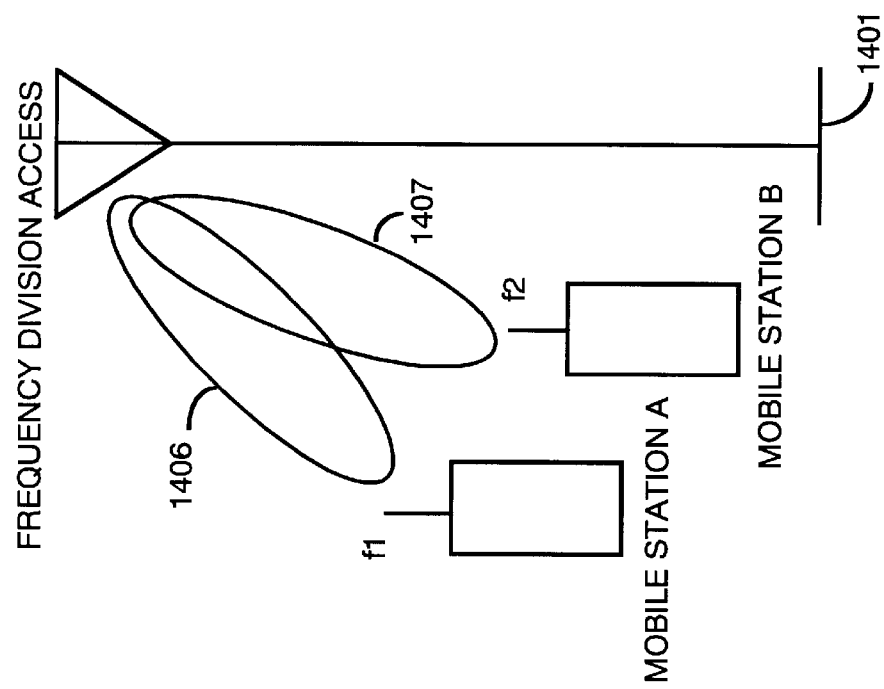
FIGS. 14A and 14B schematically show the operation of a conventional radio system.
Figure 14A:
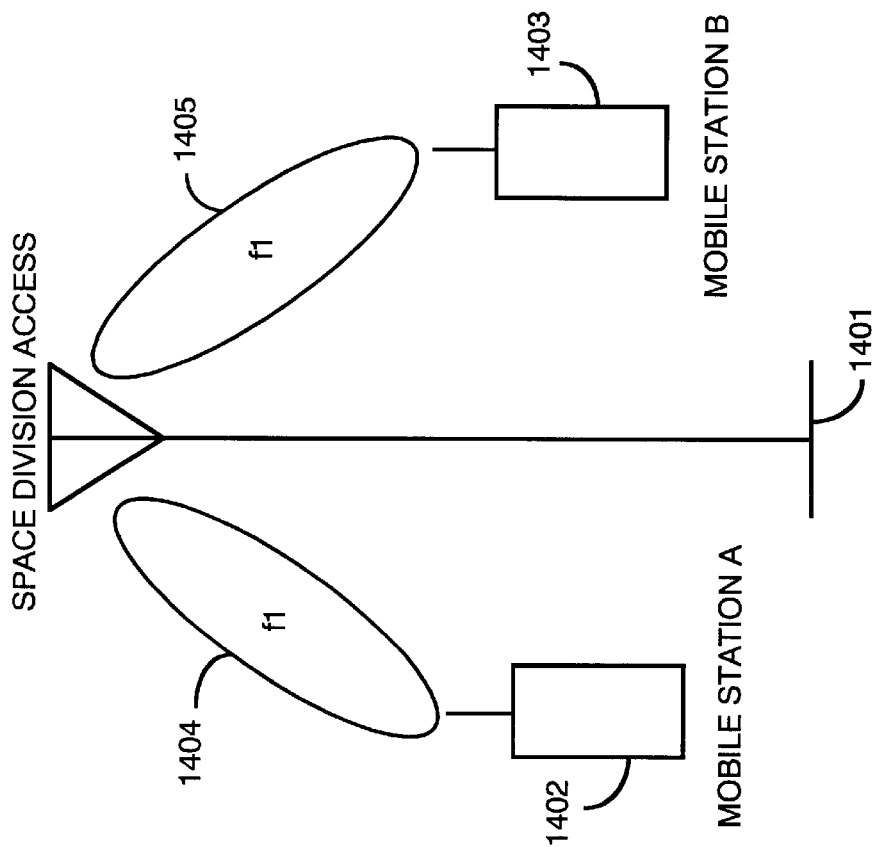

The operation of the access system switching unit 1107 will be described with reference to FIG. 12. Processings performed in steps S1201 to S1205 of FIG. 12 are the same as those processed in steps S301 to S305 of FIG. 1 (First Embodiment). Accordingly descriptions of the processings in steps S1201 to S1205 are omitted here. In the fourth embodiment of the present invention, the baseband units of the base station and each mobile station are instructed so that the grouped mobile stations change over their access system to the time-division access system. At the same time, the access system switching unit 1107 notifies upper layers of the network side and the mobile station side of the fact that the information transmitting rate decreases within the radio zone.

As mentioned above, by notifying the upper layers that the transmission rate decreases, the upper layers can cope with the decrease in the transmission rate due to the change of the access system, and the lost of data can be prevented in advance.

The invention being thus described, it will be obvious that the same may be varied in many ways. Such variations are not to be regarded as a departure from the spirit and scope of the invention, and all such modifications as would be obvious to one skilled in the art are intended to be included within the scope of the following claims.

What is claimed is:

1. A radio communication system, comprising:
   a plurality of mobile communication stations and a base station, said base station and said plurality of mobile communication stations being communicatively coupled through radio communication channels, said base station including a digital beam forming (DBF) antenna for providing a space-division multiple access method to said mobile communication stations by forming beams having different directions for mobile communication stations at diverse locations from each other, wherein each beam is directed to a particular mobile communication station location and has the same frequency as all other beams formed by said DBF antenna;
   detection means for detecting whether any of said plurality of mobile communication stations are located with respect to each other at a distance less than a minimum distance required for space-division multiple access to function properly; and
   change-over means for causing mobile communication stations detected to be located at less than said minimum distance with respect to each other to switch from said space-division multiple access method to an alternate multiple access method, and causing said base station to communicate with said detected mobile communication stations using said alternate multiple access method.

2. The radio communication system of claim 1, wherein said detection means comprises:
   means for storing mobile communication station location information obtained by tracking locations of said plurality of mobile communication stations; and
   means for grouping together any mobile communication stations required to switch to said alternate multiple access method, in accordance with said stored location information.

3. The radio communication system of claim 1, wherein said detection means comprises:
   means for receiving notification messages from mobile communication stations that have detected interference from adjacent mobile communication stations; and
   means for grouping together any mobile communication stations required to switch to said alternate multiple access method, in accordance with said notification messages.

4. The radio communication system of claim 1, wherein said change-over means includes means for increasing the transmission rate of said radio communication system with respect to mobile communication stations switched to said alternate multiple access method, so as to maintain information transmission rates of individual mobile communication stations to be the same as information transmission rates using said space-division multiple access method.

5. The radio communication system of claim 1, wherein said change-over means includes means for notifying upper layers of an application associated with a communication network connected to said radio communication system that transmission rates of said radio communication system have decreased when said space-division multiple access method has been switched to said alternate multiple access method.

6. The radio communication system of claim 1, wherein said alternate multiple access method is a time-division multiple access method.

7. The radio communication system of claim 6, wherein said time-division multiple access method uses the same frequency as said space-division multiple access method.

8. A radio communication method used in a radio communication system having a plurality of mobile communication stations and a base station, said base station and said plurality of mobile communication stations being communicatively coupled through radio communication channels, said base station including a digital beam forming (DBF) antenna for providing a space-division multiple access method to said mobile communication stations by forming beams having different directions for mobile communication stations at diverse locations from each other, wherein each beam is directed to a particular mobile communication station location and has the same frequency as all other beams formed by said DBF antenna, comprising the steps of:

detecting whether any of said plurality of mobile communication stations are located with respect to each other at a distance less than a minimum distance required for space-division multiple access to function properly; and causing mobile communication stations detected to be located at less than said minimum distance with respect to each other to switch from said space-division multiple access method to an alternate multiple access method, and causing said base station to communicate with said detected mobile communication stations using said alternate multiple access method.

9. The radio communication method of claim 8, wherein said detecting step comprises the steps of:

storing mobile communication station location information obtained by tracking locations of said plurality of mobile communication stations; and grouping together any mobile communication stations required to switch to said alternate multiple access method, in accordance with said stored location information.

10. The radio communication method of claim 8, wherein said detecting step comprises the steps of:

receiving notification messages from mobile communication stations that have detected interference from adjacent mobile communication stations; and grouping together any mobile communication stations required to switch to said alternate multiple access method, in accordance with said notification messages.

11. The radio communication method of claim 8, further comprising the step of increasing the transmission rate of said radio communication system with respect to mobile communication stations switched to said alternate multiple access method, so as to maintain information transmission rates of individual mobile communication stations to be the same as information transmission rates using said space-division multiple access method.

12. The radio communication method of claim 8, further comprising the step of notifying upper layers of an application associated with a communication network connected to said radio communication system that transmission rates of said radio communication system have decreased when said space-division multiple access method has been switched to said alternate multiple access method.

13. The radio communication method of claim 8, wherein said alternate multiple access method is a time-division multiple access method.

14. The radio communication method of claim 13, wherein said time-division multiple access method uses the same frequency as said space-division multiple access method.

* * * * *